MAGNETIC TAPE RECORDING METHODS

Original Filed Oct. 5, 1964 4 Sheets-Sheet 1

Arthur A. Cavelos
John S. Smith
INVENTORS

Arthur A. Cavelos
John S. Smith
INVENTORS

MAGNETIC TAPE RECORDING METHODS

Original Filed Oct. 5, 1964 4 Sheets-Sheet 3

Arthur A. Cavelos
John S. Smith
INVENTORS

May 12, 1970 J. S. SMITH ET AL 3,512,146

MAGNETIC TAPE RECORDING METHODS

Original Filed Oct. 5, 1964 4 Sheets-Sheet 4

Arthur A. Cavelos
John S. Smith

United States Patent Office 3,512,146
Patented May 12, 1970

3,512,146

MAGNETIC TAPE RECORDING METHODS

John S. Smith, Ridgefield, Conn., and Arthur A. Cavelos, Liverpool, N.Y., assignors, by mesne assignments, to Schlumberger Technology Corporation, Houston, Tex., a corporation of Texas Original application Oct. 5, 1964, Ser. No. 401,343, now Patent No. 3,413,626. Divided and this application Aug. 26, 1968, Ser. No. 810,399
Int. Cl. G11b *5/02;* G01d *15/12*
U.S. Cl. 340—174.1 3 Claims

ABSTRACT OF THE DISCLOSURE

A method of recording the information merged from a first and second tape onto a third tape.

This invention relates to magnetic tape recording methods and apparatus and, particularly, to such methods and apparatus for recording and reproducing data in digital form and is a division of SN 401,343 filed Oct. 5, 1964, now Pat. No. 3,413,626.

One of the faster methods of feeding data into digital computers and other digital data processing machines is by means of magnetic tape. The problem then becomes one of finding rapid and efficient methods of recording the data onto the magnetic tape. In some applications, the time required for preparation of the final tape for the computer could be considerably shortened if some way could be provided for inserting or recording additional digital data on a portion of a magnetic tape already having digital data recorded thereon without disturbing the original data. In other applications, the preparation time could be shortened if different portions of the digital data could initially be recorded on separate magnetic tapes and such separate tapes then used to obtain a single final tape for the computer or data processor. Unfortunately, methods heretofore proposed for accomplishing these purposes would be too slow and time-consuming or would require the use of relatively complex and expensive apparatus.

In seeking a solution to these problems, it has been found that the crux of the matter is the difficulty of existing tape reading or reproducing methods to rapidly and accurately fix the location of the various bits of data previously recorded on a magnetic tape. For the case where it is desired to take data from two separate tapes, this problem resolves itself into one of being able to accurately read the two tapes in step with one another with respect to the individual bits recorded on the tapes.

In applications other than preparing final computer tapes, it is frequently desired to record an electrical signal over a relatively long interval of time, such as several hours, and then be able to reproduce such electrical signal for purposes of comparison with a second electrical signal occurring during a second period of time. This is not very easily accomplished with existing apparatus, particularly where one or both of the signals occur in an irregular manner with respect to time.

It is an object of the invention, therefore, to provide a new and improved method of reading digital data recorded on magnetic tape.

It is another object of the invention to provide a new and improved method for merging additional digital data on a portion of a magnetic tape already having digital data recorded thereon.

It is a further object of the invention to provide a new and improved method of combining on a common portion of a single magnetic tape digital data occurring during two different intervals of time.

It is an additional object of the invention to provide a new and improved method for merging on a third magnetic tape digital data previously recorded on two other magnetic tapes.

It is a further object of the invention to provide a new and improved intermediate memory system for electrical signals capable of storing very long intervals of signal data and capable of reproducing such signals in an accurately controlled manner which may be quite irregular with respect to time.

In accordance with a particular feature of the invention, a method of reproducing digital indications recorded on magnetic recording tape comprises the steps of moving the tape past magnetic reading head means in a discontinuous stepwise manner and detecting the digital indications recorded on the tape. The method further includes the steps of using at least some of the detected digital indications to control the stepping of the tape during this reproducing process.

For a better understanding of the present invention, together with other and further objects and features thereof, reference is had to the following description taken in connection with the accompanying drawings, the scope of the invention being pointed out in the appended claims.

Referring to the drawings.

Figure 1:
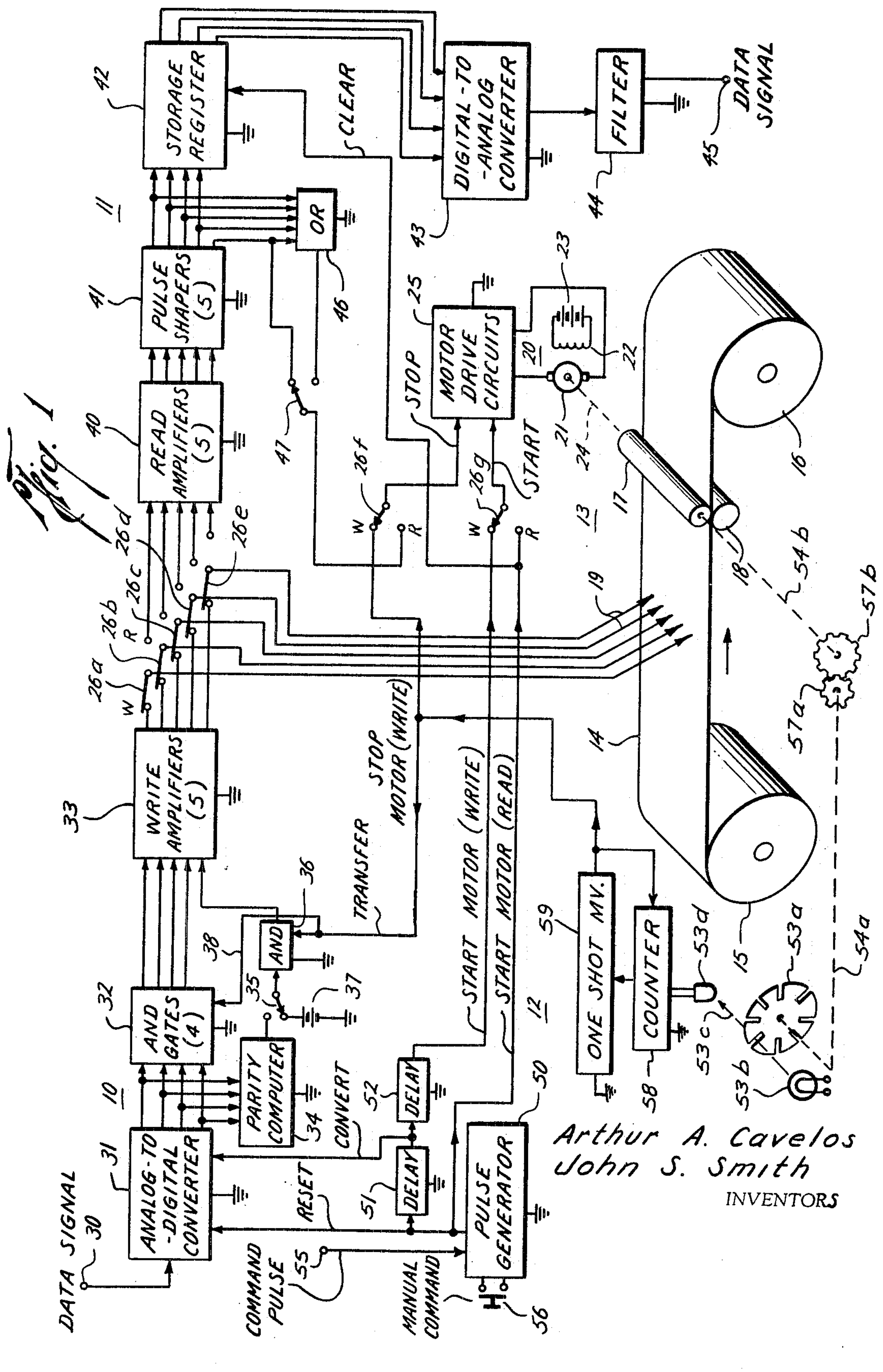
FIG. 1 shows a representative embodiment of tape recorder apparatus constructed in accordance with the present invention.

Referring to FIG. 1 of the drawings, there is shown an embodiment of the invention for both writing or recording digital data on a magnetic tape and for reading or reproducing digital data previously written on the tape. The tape recording apparatus shown in FIG. 1 includes a writing circuit section indicated generally at 10, a reading circuit section indicated generally at 11, a timing circuit section indicated generally at 12, and a tape transport section indicated generally at 13. The tape transport section 13 includes a magnetic recording tape 14 which is initally spooled on a supply reel 15 and which is transferred to a takeup reel 16 during the operation of the apparatus. Movement of the magnetic tape 14 is controlled by a drive capstan 17 in cooperation with a pressure roller 18. Signals are written on and read from the magnetic tape 14 by means of a set of five side-by-side magnetic heads 19 which are positioned across the width of the tape to record (or read) data in five parallel tracks on the tape.

Capstan 17 is driven by a direct-current electric motor 20. Motor 20 is of the high-torque, low-inertia type. It includes an armature 21, and a stationary field winding 22, the latter being energized by a battery 23. Armature 21 is mechanically connected to the capstan 17 by way of a suitable mechanical linkage represented by dash line 24. A particularly suitable type of motor for the present apparatus is a so-called "printed circuit motor" of the type described in U.S. Pat. No. 3,093,762. In such case, the stationary field may be provided by a permanent magnet instead of a field winding and battery. Motor 20 is driven by motor drive circuits 25 which are shown in detail in FIG. 2, which will be discussed hereinafter.

A set of seven single-pole, double-throw switches **26*a***–

26*g* are used to determine whether the apparatus is in a writing mode (W) or in reading mode (R). These seven switches are mechanically ganged to each other and are controlled by a single control handle. In the drawings, they are shown in the writing mode position.

The writing circuit section 10 of the present apparatus includes an analog data signal input terminal 30 which is connected to an analog-to-digital converter 31. The digital or binary output from converter 31 is supplied by way of a set of four AND gates 32 and a set of write amplifiers 33 and switches **26*a*–26*d* to the first four of the magnetic heads 19. The digital output from converter 31 is also supplied to a parity computer 34 which may be used for recording a parity signal on a fifth track on the magnetic tape 14. This parity signal is supplied by way of a switch 35, an AND gate 36, the fifth one of the write amplifiers 33 and switch 26*e* to the fifth one of the magnetic heads 19. A second position of the switch 35 is connected to a positive voltage source represented by a battery 37. Thus, either parity computer 34 or battery 37 may be connected to a first input of AND circuit 36**.

AND gates 32 include four individual AND gate circuits sitting side-by-side and individually connected to a different one of the output lines from converter 31. A transfer signal supplied on a transfer line 38, on the other hand, is supplied ot a second input of each of the four AND gates 32. Write amplifiers 33 include five individual amplifier circuits sitting side-by-side for individually and separately amplifying a different one of the five input signals supplied thereto.

The reading circuit section 11 of the apparatus includes a set of five read amplifiers 40, the inputs of which are individually connected to a different one of the magnetic heads 19 when the switches **26*a*–26*e* are in the reading mode. Read amplifiers 40 are, in turn, coupled to five individual pulse shapers 41. The first four of pulse shapers 41 are connected in a parallel fashion to the four stages of a binary storage register 42. These four stages are, in turn, coupled to the input side of a digital-to-analog converter 43. The output of converter 43 is supplied by way of a low-pass filter 44 to a data signal output terminal 45**.

It is to be clearly understood that the use of only four binary data bits at a time in the present system is intended as an example only. It will frequently be the case that the data signals will be broken down into a different number of digital or binary data bits, in which case, the number of circuits in units 32, 33, 40, 41 and 42 will be adjusted accordingly. Thus, in a seven-bit system, for example, AND gates 32 would include seven individual AND gate circuits.

The outputs of pulse shapers 41 are coupled also by way of an OR circuit 46, a switch 47 and the switch **26*f* to the "stop" terminal of motor drive circuits 25. The second or upper contact of switch 47 is connected to the output line from the lower one of the pulse shapers 41**.

The timing circuit section 12 of the apparatus includes a controlled or triggered pulse generator 50 which generates an initial or primary timing pulse for each cycle of operation. This initial timing pulse is applied to cascade-coupled delay networks or circuits 51 and 52 to generate time-spaced secondary timing pulses for each cycle of operation. The pulse generator 50 may be triggered by either a command pulse supplied by way of an input terminal 55 or by momentarily closing a pushbutton switch 56.

Timing circuits 12 also include means coupled to the tape transport mechanism for generating a further timing signal or control signal which is indicative of the mechanical movement of the tape 14. This means includes a slotted shutter disk **53*a* of opaque material which is mechanically coupled to capstan 17 by way of mechanical linkage represented by dash line 54*a*, spur gears 57*a* and 57*b* and mechanical linkage represented by dash line 54*b*. The gearing is such that shutter disk 53*a* rotates at a much more rapid rate than does the capstan 17. Shutter disk 53 serves to periodically pass a beam of light 53*c* from a light source 53*b* to a photocell 53*d*. The corresponding electrical impulses generated by photocell 53*d* are supplied to the counting input of a pulse counter 58. After a predetermined number of pulses have been counted, an output pulse is produced and supplied to a one-shot multivibrator 59 to trigger same. The multivibrator pulse constitutes an additional secondary timing pulse which appears once each cycle of operation. The multivibrator pulse is also supplied back to the reset terminal of counter 58** for resetting such counter to its desired initial condition.

Considering now the operaton of the FIG. 1 apparatus, it will first be assumed that the apparatus is in the writing mode, that the magnetic tape 14 is preferably blank (i.e., nothing recorded thereon), that most of the tape 14 is spooled on the supply reel 15, and that an analog data signal is being supplied to the input terminal 30. The pulse generator 50 is triggered each time it is desired to record a data signal value on the magnetic tape 14. This triggering may be done by way of externally generated command pulses or by a momentary closing of the pushbutton switch 56. In the case of a single, continuously present data signal from a single transducer, where it is desired to merely record periodic data signal samples, the external command pulses may be obtained from a free-running pulse generator of the appropriate frequency. In the more usual case of time-multiplexed data signals from a number of sources, timing pulses derived from the multiplexed pulse train may be used as the command pulses. In some cases, the leading edges of the data pulses themselves can be used for this purpose.

In any event, when it is desired to record a data signal value, pulse generator 50 is triggered to produce a primary or initial timing pulse for the recording cycle. Such pulse is supplied to the analog-to-digial converter 31 to reset such converter to an initial condition. Such pulse is also supplied to the input of delay circuit 51. After a fixed interval of time, a secondary timing pulse appears at the output of delay circuit 51 and is supplied to the analog-to-digital converter 31 to start the conversion process therein. The time delay provided by delay circuit 51 is made equal to the time required to reset the converter 31. A short time after the appearance of a pulse at the output of delay circuit 51, another secondary timing pulse appears at the output of delay circuit 52. This pulse is supplied by way of the switch **26*g* to the "start" terminal of motor drive circuits 25. This activates motor drive circuits 25 which, in turn, energizes the motor 20 and starts the movement of the magnetic tape 14. The time delay for delay circuit 52 is set to correspond to the maximum time required to complete the conversion process in the analog-to-digital converter 31. This allows the conversion process to be completed before the motor 20 is started. In some cases, time may be saved by starting the motor 20 at some intermediate stage during the analog-to-digital conversion process, in which case the delay of unit 52** may be adjusted accordingly.

A short time after the motor 20 is started, a further timing pulse appears at the output of one-shot multivibrator 59. This timing pulse, which is used as a transfer command pulse, is supplied to AND gates 32 and AND gate 36 and will pass through and appear on the output line for any of these AND gates whose input line is at a binary "one" level. By this time, the analog-todigital conversion process has been completed and the appropriate ones of the converter 31 output lines are energized in accordance with the binary representation for the particular data signal value just converted. The resulting output pulses from AND gates 32 and AND gate 36 are supplied by way of individual ones of the write amplifiers 33 and switches **26*a*–26*e* to individual ones of the magnetic heads 19 which, at this time, are functioning as recording heads. Also, by this time the magnetic tape 14 has accelerated and is moving at a satisfactory recording speed. Consequently, the appropriate magnetic representations of the binary bit values are recorded in the five tracks on the magnetic tape 14**.

At the same time, the timing pulse from multivibrator 59 is also supplied by way of switch 26*f* to the "stop" terminal of motor drive circuits 25. This disables the motor drive circuits 25 which, in turn, de-energizes the motor 20 and, hence, stops the movement of the tape 14. This does not interfere with the recording of the data pulses on the magnetic tape 14 because some small fraction of time is required to get the motor 20 and tape 14 stopped. The purpose of the shutter disk 53*a* and the pulse counter 58 is to accurately fix the length of tape that passes the magnetic heads 19 between the starting and stopping of the tape 14. This provides uniform spacing for successive bit intervals on the tape 14. Rotation of the shutter disk 53*a* is proportional to the movement of the tape 14. Because of the higher rate of rotation of disk 53*a* and the large number of slots or light apertures in the periphery thereof, the resulting light impulses which reach photocell 53*d* correspond to very small increments of length along the tape 14. By counting these impulses, the length of a bit interval can be determined with a high degree of precision.

When the motor 20 and tape 14 are stopped, this completes the cycle of operation and the magnetic tape 14 remains at rest until the occurrence of the next command pulse. When the next command pulse occurs, the tape 14 is advanced another step and another data signal value is recorded on the tape 14 in digital form. This process is repeated until tape 14 is filled in the desired manner. Thus, there is provided an incremental step-by-step recording of digital data indications along the length of the magnetic tape 14.

The purpose of the parity computer 34, which is operative when switch 35 is in its upper position, is to enable a binary "one" value to be recorded in the fifth track on the magnetic tape 14 whenever no or an even number of binary "one" indications are to be recorded in the first four tracks on the tape. As a consequence, at least one binary "one" value will be recorded each time the tape 14 is stepped. By placing switch 35 in the lower position, thus connecting it to battery 37, a binary "one" value will be recorded in the fifth track each time the tape 14 is stepped, regardless of what is recorded on the other four tracks. Such pulses in the fifth track serve as "index" pulses.

Considering now the reading or playback operation of the FIG. 1 apparatus, it is assumed that the switches 26*a*–26*g* are set to their read positions (R) and that the recorded tape 14 has been rewound onto the supply reel 15. In accordance with a feature of the present invention, a recorded tape is read in a discontinuous step-by-step manner instead of the conventional continuous manner. To this end, the pulse generator 50 is triggered each time it is desired for the tape 14 to advance one step. Since the recorded data is evenly spaced along the length of the tape 14, this stepping may be readily realized by connecting the output of a free-running pulse generator of appropriate frequency to the command pulse terminal 55.

Each time it is desired to read one of the data values recorded on the tape 14, the pulse generator 50 is triggered. The resulting output pulse from generator 50 is supplied by way of switch 26*g* to the "start" terminal of the motor drive circuits 25. This starts the motor 20 and the movement of the tape 14. This same pulse is also supplied to the storage register 42 for purposes of "clearing" the register, that is, returning it to a zero data value condition. No further use is made of the timing circuit portion 12 during the reading process.

As the magnetic tape 14 advances, the binary indications recorded in the different tape tracks are detected by the magnetic heads 19 which, at this time, are functioning as reading heads. The resulting binary signals are supplied by way of switches 26*a*–26*e* to individual ones of read amplifiers 40 and from there to individual ones of pulse shapers 41. Signals from the first four tracks are supplied to the storage register 42 and stored therein. The digital-to-analog converter 43 is continuously operative to convert the storage register binary value into a corresponding analog signal which is supplied by way of the filter 44 to the output terminal 45. Filter 44 is used to smooth out the momentary interruptions in the analog signal intermediate the clearing of the storage register 42 and the placing of new data therein. In some applications, the filter 44 may be omitted.

The binary signals appearing at the output of pulse shapers 41 are also supplied to OR circuit 46. For the moment, it is assumed that switch 47 is in the lower position. As a consequence, the occurrence of a binary "one" pulse on any one of the five input lines to the OR circuit 46 is supplied by way of the switch 47 and switch 26*f* to the "stop" terminal of the motor drive circuits 25. This stops the motor 20 and the magnetic tape 14. With the switch 47 instead set to the upper position, as shown in the drawing, only the index pulses or reference pulses recorded in the fifth track on the magnetic tape are used to stop the motor drive circuits 25 and, hence, the tape 14. In this case it is necessary that index pulses, as opposed to parity pulses, have been recorded in the fifth track on the tape. For the case of parity pulses, the switch 47 must be in the lower position so as to be sure to obtain a pulse for each data group or character on the tape 14.

A feature of the present invention is the fact that the stopping of the tape during the reading process is controlled by the signals recorded on the tape itself. This eliminates any errors due to tape slippage or the like. Also, since the starting and stopping of the tape is quite quick and precise, it ensures that the tape will not end up being stopped too close to the next succeeding data group on the tape. This eliminates loss of signal pulses in the succeeding group due to the tape having not built up enough speed when the data bits pass under the magnetic heads 19.

It should be further noted that either the input signals or the output signals, or both, for the apparatus of FIG. 1 may be in digital form instead of analog form. In the case of input signals, this would mean that the analog-to-digital converter 31 would be omitted or, perhaps, replaced by a storage register, depending upon the particular circumstances. In the case of the output signal, this means that the final output signal would instead be taken from the storage register 42.

Figure 2:
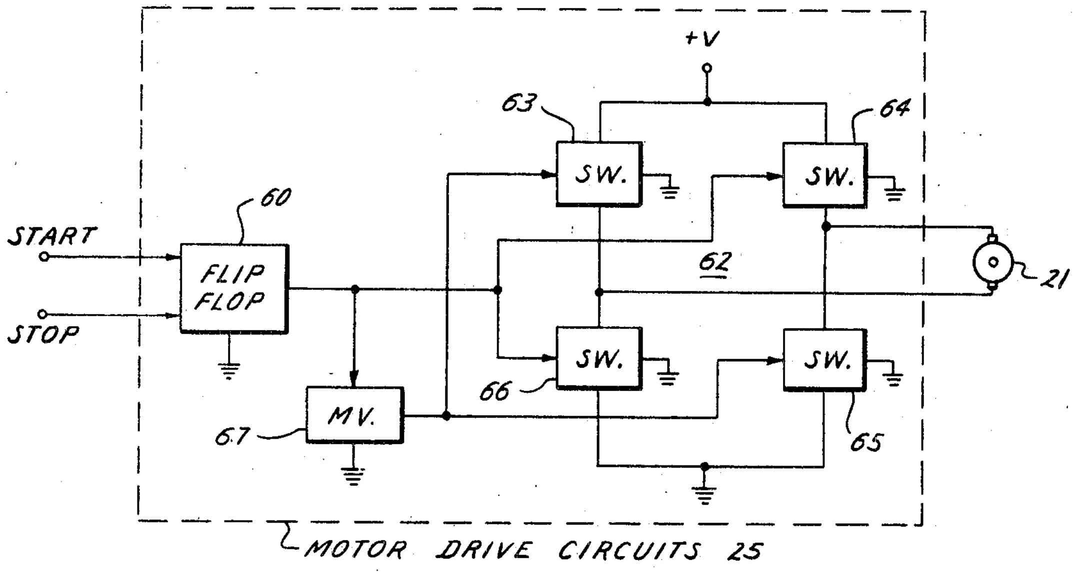
FIG. 2 shows a portion of the FIG. 1 apparatus in greater detail.

Referring now to FIG. 2 of the drawings, there is shown in greater detail the manner of construction of motor drive circuits 25. Such circuits include a flip-flop circuit 60 which is used to control a bridge-type switching circuit 62. Bridge circuit 62 includes four switching devices 63, 64, 65 and 66 located in the four arms of the bridge. The motor armature 21 is connected across one diagonal of the bridge circuti. A source of voltage +V is connected across the other diagonal of the bridge, the return being by way of chassis ground. Switching devices 63–66 may be of the vacuum tube type, the transistor type, or the electromechanical relay type.

When a "start" pulse is applied to the flip-flop 60, the output thereof goes to a relatively high voltage level. This activates the switching devices 64 and 66 and renders them conductive. This allows current to flow from the source +V through the switching device 64, the motor armature 21 and the switching device 66 to chassis ground. This energizes the motor and causes it to rotate.

This condition prevails until a "stop" pulse is applied to the flip-flop circuit 60. When this happens, the output of flip-flop 60 returns to a low level (preferably zero volts). This disables switching devices 64 and 66. The resulting signal transition when the flip-flop 60 returns to a low level also serves to trigger a one-shot multivibrator 67. This causes multivibrator 67 to produce a short duration output pulse. This pulse is applied to switching devices 63 and 65 to momentarily activate these devices and render them conductive. During this occurrence, current will flow from the source +V, through the switching device 63, the motor armature 21 and the switching device 65 to chassis ground. This momentary current flow is in a reverse direction through the armature 21 and tends to cause the armature 21 to rotate in the opposite direction. Actually, it does not exist long enough for this to occur. Instead, it applies a momentary braking action which serves to stop the motor 20 more quickly.

Figure 3:
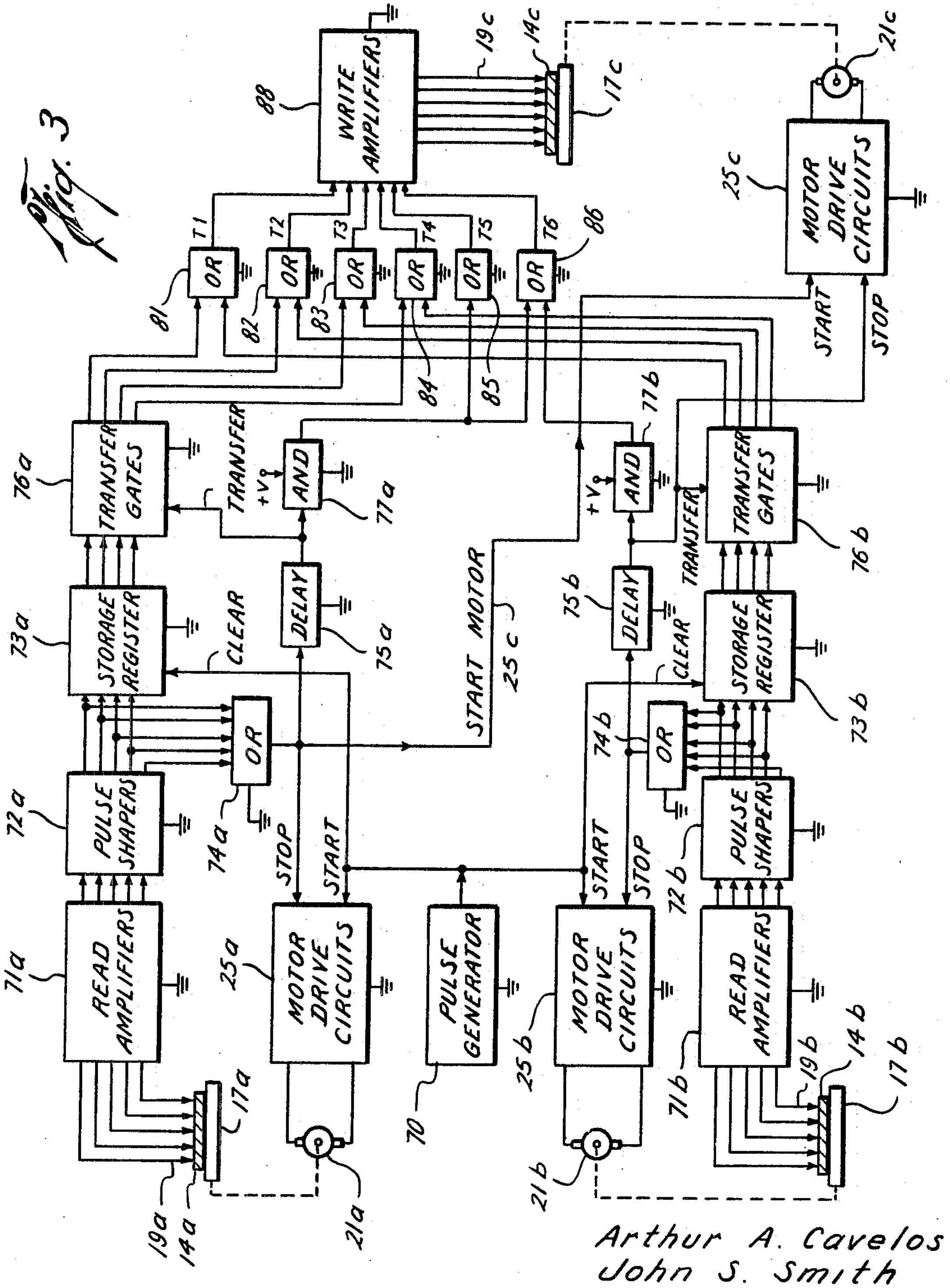
FIG. 3 shows another embodiment of the invention which is useful for merging on a third tape digital data previously recorded on two other tapes.

Referring now to FIG. 3 of the drawings, there is shown an embodiment of the invention for recording on a single magnetic tape 14c the data signals previously recorded on two other magnetic tapes 14a and 14b. In FIG. 3, suffixes "a," "b" and "c" are used to denote elements which are of the same construction as elements in FIG. 1 bearing the same reference numeral except for the suffix. In FIG. 3, all three magnetic tapes 14a, 14b and 14c are moved in a step-by-step manner with the stepping of each being coordinated with that of the others. This provides an accurate and reliable merging of the two sets of data on the third tape 14c.

Each cycle of operation in FIG. 3 is initiated by a pulse from a pulse generator 70. Pulse generator 70 is of the free-running type and produces periodic output pulses at a rate which is compatible with the time required to complete each cycle of operation of the remainder of the apparatus. Assuming that the two recorded tapes 14a and 14b have been properly spooled onto their respective supply reels in the correct starting positions, then when a pulse is generated by the pulse generator 70, it is supplied to the "start" terminals of motor drive circuits 25a and 25b associated with the tape transport mechanisms for the tapes 14a and 14b, respectively. This causes the tapes 14a and 14b to commence moving past their magnetic heads 19a and 19b. Considering first the upper channel, the binary signal indications recorded on the tape 14a are detected by magnetic heads 19a and supplied by way of read amplifiers 71a and pulse shapers 72a to a storage register 73a. Just prior to this, the storage register 73a was "cleared" by the pulse from generator 70. For the lower channel, the binary signals on tape 14b are detected by magnetic heads 19b and supplied by way of read amplifiers 71b and pulse shapers 72b to a storage register 73b. Just prior to this, the storage register 73b was "cleared" by the pulse from generator 70.

The binary signals appearing at the outputs of pulse shapers 72a are supplied to an OR circuit 74a. The resulting pulse appearing at the output of OR circuit 74a is immediately supplied to the "start" terminal of the third motor drive circuits 25c to start the movement of the third magnetic tape 14c upon which the two sets of data signals are to be merged. This output pulse is also supplied to the "stop" terminal of motor drive circuits 25a to stop the movement of tape 14a. This pulse is also supplied by way of a delay circuit 75a to a set of transfer gates 76a connected to the output lines of storage registers 73a. The time delay of delay circuit 75a is selected to allow the third tape 14c to accelerate to the proper recording speed before any binary signals are supplied to the recording heads 19c associated therewith. The pulse appearing at the output of delay circuit 75a is supplied to transfer gates 76a and produces binary pulses at the outputs of transfer gates 76a in accordance with the data value in storage register 73a. These binary pulses are then supplied by way of individual OR circuits 81–84 and individual ones of write amplifiers 88 to the magnetic heads 19c for the first four tracks on the magnetic tape 14c. This causes these binary signals to be recorded in in these tracks. The designations T1, T2, etc., are used to refer to Track 1, Track 2, etc., on the tape 14c.

The transfer pulse appearing at the output of delay circuit 75a is also supplied by way of an AND circuit 77a and each of a pair of OR circuits 85 and 86 and a corresponding pair of circuits in the write amplifiers 88 to the magnetic heads 19c for Tracks 5 and 6 on the tape 14c. This causes a binary "one" indication to be recorded in each of Tracks 5 and 6 at the same time that data indications from the upper channel (tape 14a) are being recorded in the first four tracks on the tape 14c. These Tracks 5 and 6 reference indications are used for both indexing and channel identification purposes.

The five output lines from pulse shapers 72b of the lower channel are connected to an OR circuit 74b to produce at the output side thereof an output pulse at about the same time that the output pulse appeared at the output of OR circuit 74a of the upper channel. This pulse from the OR circuit 74b is supplied to the "stop" terminal of motor drive circuits 25b, thus stopping the movement of the lower tape 14b at about the same time that the upper tape 14a is stopped. The pulse from OR circuit 74b is also supplied by way of a delay circuit 75b to provide a transfer pulse for a set of transfer gates 76b coupled to the output of the lower storage register 73b. This causes binary pulses to appear on the output lines of transfer gates 76b in accordance with the binary data values stored in register 73b. These data pulses at the output of transfer gates 76b are supplied by way of OR circuits 81–84 and write amplifiers 88 to the recording heads 19c and are recorded in the first four tracks on the tape 14c. The time delay provided by delay circuit 75b is selected so that pulses from the lower transfer gates 76b are not supplied to the recording heads 19c until after the pulses from the upper transfer gates 76a have already been recorded on the tape 14c. Thus, delay circuit 75b has a time delay which is greater than that of time delay circuit 75a, the excess being that required to give the successive data bits the desired spacing on the tape 14c.

The pulse from delay circuit 75b is also supplied by way of an AND circuit 77b, the lowermost OR circuit 86 and the lowermost one of write amplifiers 88 to the magnetic head 19c for Track 6 on the tape 14c. This records a binary "one" value at the same time that the primary data values from the lower channel (tape 14b) are recorded on the third tape 14c. This Track 6 reference indication is used for indexing purposes. At this time, a "zero" value is recorded in Track 5.

The output pulse from delay circuit 75b is also supplied to the "stop" terminal of the motor drive circuits 25c. This stops the movement of the third tape 14c. Since there is a small time lag in getting the tape 14c completely stopped, sufficient time is provided for the recording of the data bits from transfer gates 76b.

All three of the magnetic tapes 14a, 14b and 14c are now at rest and remain in this condition until the occurrence of the next cycle initiating pulse from pulse generator 70. Since the pulses from pulse generator 70 occur in a periodic manner, the three tapes 14a, 14b and 14c are advanced in a step-by-step manner until all the desired data values on the two tapes 14a, and 14b have been combined onto the third tape 14c. The step-by-step manner of operation provides an accurate and extremely precise method of synchronizing the reading of the two tapes 14a and 14b.

Figure 4:
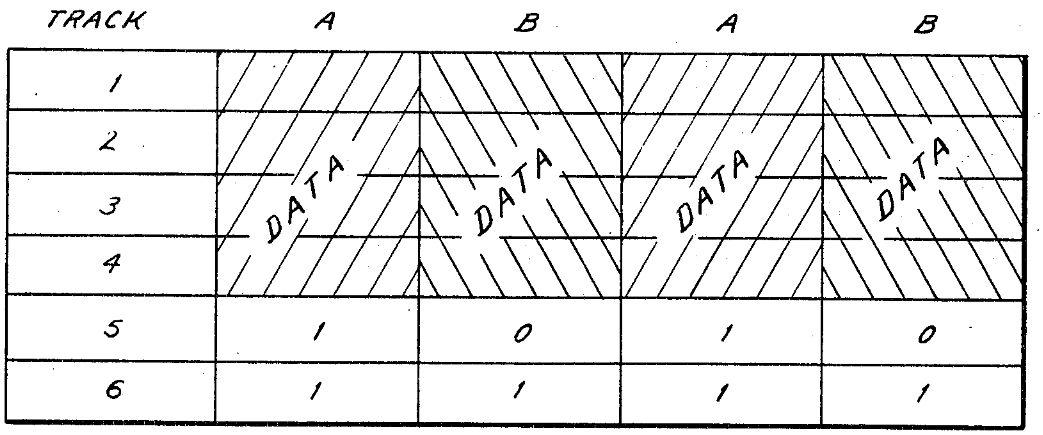
FIG. 4 shows one manner in which two different sets of data may be merged on a single magnetic tape.

Referring now to FIG. 4, there is shown the manner in which the data values are recorded on the magnetic tape 14c. The primary data bit indications for Channel A (from tape 14a) and Channel B (from tape 14b) are recorded in an alternate fashion in the first four tracks on the magnetic tape 14c. An indexing pulse or binary "one" indication is recorded in Track 6 for each occurrence of each channel. Coded identification signals are recorded in Track 5, binary "one" values being recorded for Channel A intervals and binary "zero" values being recorded for Channel B intervals. These identification signals in Track 5 enable subsequent identification and segregation of the two sets of recorded data.

Figure 5:
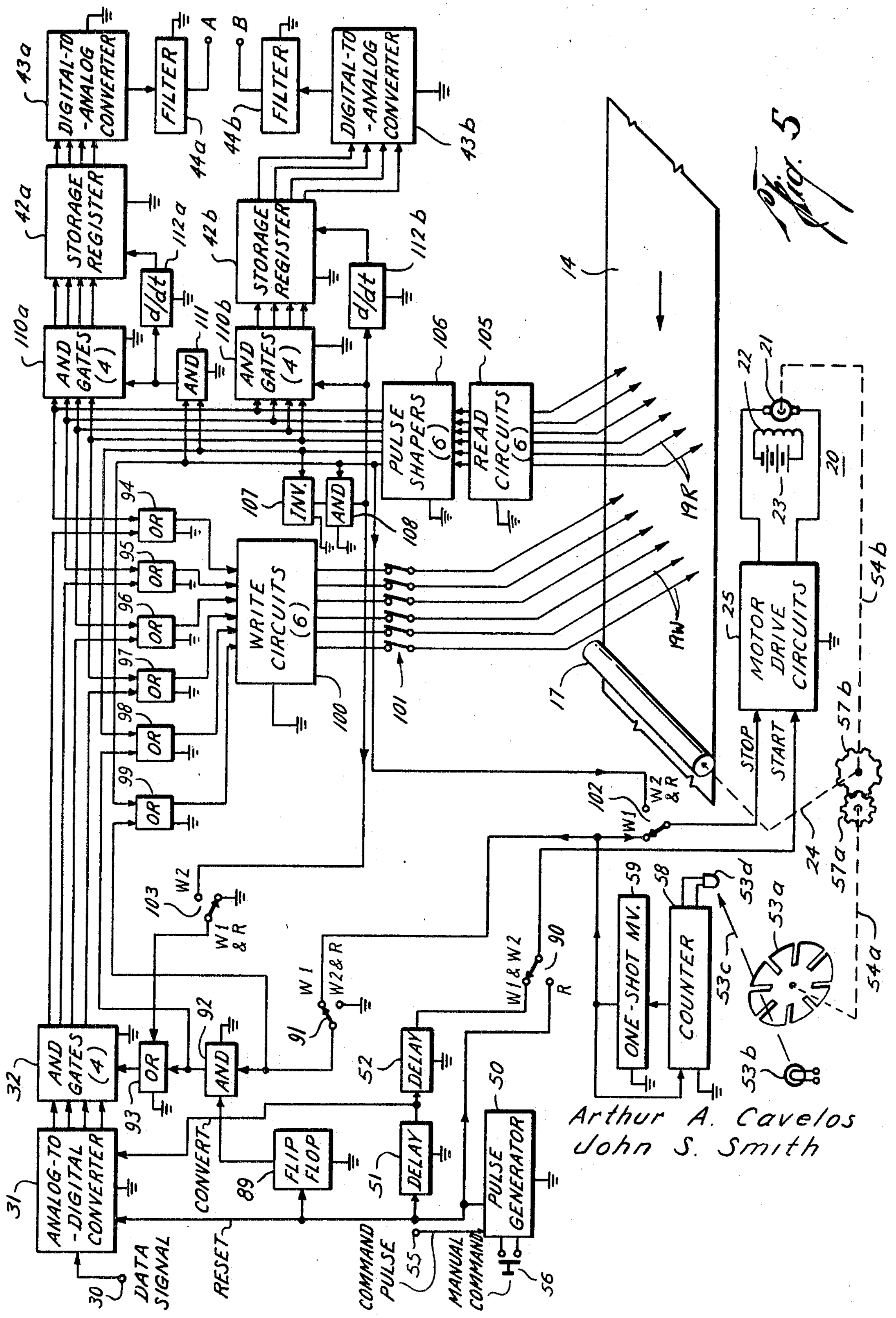
FIG. 5 shows a further embodiment of the invention which is useful for merging a second set of digital data on a portion of a magnetic tape already having a first set of data recorded thereon.

Referring now to FIG. 5 of the drawings, there is shown a further embodiment of the invention for combining or merging two different sets of data signals obtained during two completely different time intervals onto a single magnetic tape. Elements which are the same as those of the FIG. 1 embodiment are identified by the same reference numerals. Elements which are the same as those of FIG. 1 except that they are used in duplicate are identified by the same reference numeral but with a suffix letter attached thereto. In FIG. 5, separate sets of magnetic heads are used for the reading and writing functions, the reading heads being identified as 19R and the writing heads as 19W. The writing heads 19W are located on the downstream side of the reading heads 19R.

The FIG. 5 apparatus is constructed to record data values on the magnetic tape 14 in the same manner as indicated in FIG. 4, but with one important exception. In FIG. 5, the data values for Channel A are recorded during a first passage of the magnetic tape 14 past the magnetic heads 19R and 19W. The tape 14 is then rewound and the data values for Channel B are then recorded on the tape 14 during a second passage of the tape 14 past the magnetic heads 19R and 19W. The reference indications in Tracks 5 and 6, on the other hand, are all recorded during the first passage of the tape 14 past the heads 19R and 19W. As will be seen, they are then used during the second passage of the tape for purposes of controlling the operation of the remainder of the apparatus.

It is initially assumed that the tape 14 is in a blank or erased condition and that the tape 14 is wound mostly on the supply reel. It is further assumed that the various switches shown in FIG. 5 are in the positions indicated in the drawing. In this regard, the notation W1 adjacent a switch position indicates the position that is used during the first passage of the tape 14 past the magnetic heads 19 for recording purposes, while the notation W2 indicates the position that is used during the second passage of the tape 14 for recording purposes. The notation "R" denotes positions used when it is only desired to read the data recorded on the tape.

With the apparatus of FIG. 5 initially in the W1 mode for writing the first set of data values on the tape 14, each cycle of operation is initiated by a pulse from the pulse generator 50. Thus, upon the occurrence of a pulse at the output of pulse generator 50, this pulse is supplied to the analog-to-digital converter 31 to reset same and is also supplied to delay circuits 51 and 52 and to a common trigger input for a flip-flop circuit 89. It is assumed for the moment that this sets the flip flop 89 so that its output is at a binary "one" level. The pulse appearing at the output of delay circuit 51 is supplied to the analog-to-digital converter 31 to start the conversion process therein. Shortly thereafter, the pulse appearing at the output of delay circuit 52 is supplied by way of a switch 90 to the "start" terminal of motor drive circuits 25. This starts the movement of the tape 14. A short time thereafter, the pulse appearing at the output of one-shot multivibrator 59 is supplied by way of a switch 91 and AND circuit 92 and OR circuit 93 to the second or transfer inputs of each of the AND gate 32. AND circuit 92 is in an operative condition at this time because the output of flip-flop 89 is at the binary "one" level. The resulting pulses from AND gates 32, which appear on the parallel output lines thereof and which correspond to the binary representaiton of the data value just converted by the converter 31, are supplied by way of OR circuits 94, 95, 96 and 97, four of the write circuits 100 and normally closed switches 101 to the magnetic writing heads 19W for the first four tracks on the tape 14.

At the same time, the control pulse from one-shot multivibrator 59 is supplied by way of AND circuit 92, OR circuit 98 and the fifth of the write circuits 100 and switches 101 to the writing head 19W for Track 5. This control pulse is also supplied by way of OR circuit 99 and the sixth of the write circuits 100 and switches 101 and to the writing head 19W for the sixth track on the tape 14. This provides the recording of a binary "one" value in Track 5 for identification purposes and the recording of a binary "one" value in Track 6 for indexing purposes.

At the same moment that the various binary signals are being recorded on the tape 14, the control pulse at the output of one-shot multivibrator 59 is supplied by way of a switch 102 to the "stop" terminal of motor drive circuit 25. This stops the movement of the tape 14. During this W1 mode, a switch 103 connected to the second input of OR circuit 93 is connected to chassis ground so that no signals are supplied by way of the switch 103.

The tape 14 remains at rest until the occurrence of the next pulse at the output of pulse generator 50. Upon such occurrence, a similar cycle of operation is repeated but with one important exception. This second pulse from generator 50 flips the flip-flop 89 so that the output therefrom is at the binary "zero" level. As a consequence, AND circuit 92 is no longer operative. As a consequence, the control pulse from multivibrator 59 cannot reach the AND gates 32. Also, no control pulse is supplied to OR circuit 98 and the fifth of the write circuits 100. Thus, only binary "zeros" are written in Tracks 1–5 on the tape 14 during this second step. An indexing pulse "one" value is recorded in Track 6, however, since the control pulse is still supplied to OR circuit 99 and to the sixth of the write circuits 100. The tape 14 is again stopped by the control pulse supplied by way of switch 102.

Upon the occurrence of the third pulse from generator 50, the flip-flop 89 is flipped back to its original condition where its output is at the binary "one" level. As a consequence, the apparatus operates in the same manner as for the first pulse from generator 50 to record data values on the magnetic tape 14 during the third step thereof. Thus, during odd numbered steps of the tape 14, Channel A data values are recorded on the tape 14. During even numbered steps, no data values are recorded on the tape 14. Instead, only binary "zero" values are recorded. Thus, in terms of the FIG. 4 sketch, the Channel B intervals are left vacant of data values during the first passage of the tape 14 past the magnetic heads 19, except, of course, that an indexing pulse is recorded as a binary "one" indication in Track 6.

After the first set of data values have been recorded on the magnetic tape 14, the tape 14 is rewound onto the supply reel and is then ready to commence recording a second set of data values on the tape. At this time, the second analog data signal source is connected to the input terminal 30. Also, switches 91, 102 and 103 are set to their second positions (W2 positions) and switches 101 remain closed. This alters the operation somewhat. In fact, it effectively removes the flip-flop circuit 89 and the AND circuit 92 from the system and causes the transfer control pulses to be supplied by way of the switch 103, which is now in its upper position.

More specifically, a pulse appearing at the output of generator 50 both resets converter 31 and, at the same time, is supplied to delay circuit 51. The pulse at the output of delay circuit 51 causes converter 31 to convert. The pulse at the output of delay circuit 52 starts the motor drive circuits 25 and, hence, the tape 14. As the tape 14 advances, the six tracks thereon are sensed by the reading heads 19R and any binary signals occurring therein are detected and supplied by way of read circuits 105 to pulse shapers 106. The resulting Track 6 index pulse appearing on the left-hand output line from the pulse shapers 106 is supplied by way of the switch 102 to the "stop" terminal of motor drive circuits 25. This stops the tape movement.

If a Channel A code pattern is detected in Tracks 5 and 6 (a "one-one" binary pattern), then the only thing that happens is that the signals from all six tape tracks are supplied by way of OR circuits 94–99, write circuits 100 and switches 101 to the writing heads 19W for rewriting on the tape 14. This rewriting obliterates any old signals appearing at this point on the tape and replaces them with the new or rewritten signals. If, on the other hand, a Channel B code pattern (a "zero-one" binary pattern) is detected, then the combination of inverter circuit 107 and AND circuit 108 is operative to produce at the output of AND circuit 108 a transfer pulse which is supplied by way of switch 103 to the OR circuit 93 and, hence, to the AND gates 32. This transfer pulse causes the binary "one" values appearing on the output lines of converter 31 to be reproduced as output pulses on the corresponding output lines from AND gates 32. These pulses from AND gates 32 are supplied by way of OR circuits 94–97 and write circuits 100 to the writing heads 19W for recording in Tracks 1–4 of the tape 14. In this manner, binary data signals are recorded for the Channel B intervals on the tape 14. The index pulse previously recorded in Track 6 is also rewritten at this time. Note that no signals are, at this time, being supplied to OR circuits 94–98 from the pulse shapers 106 because only "zero" valves are, i.e., nothing is being detected in Tracks 1–5 at this time.

The inverter circuit 107 detects the occurrence of a "zero" value in Track 5 and inverts it to a binary "one" value. This "one" value is supplied to a first input terminal of the AND circuit 108, while the "one" value from Track 6 is supplied to the other input terminal of AND circuit 108. This produces a "one" level output pulse at the output of AND circuit 108. This pulse is used to provide the transfer action for the AND gates 32.

In order to read or reproduce the data values recorded on the tape 14, the tape is rewound on the supply reel and switches 90, 91, 102 and 103 are set to their read (R) positions. Also, all of switches 101 are placed in their open positions. The tape 14 is then advanced in a step-by-step manner, one step each time a pulse appears at the output of pulse generator 50. In particular, the pulse at the output of generator 50 is supplied by way of switch 90 to the "start" terminal of motor drive circuits 25, thus, starting the motor 20 and the tape 14. The binary indications previously recorded on the tape 14 are detected by reading heads 19R and supplied by way of read circuits 105 to the pulse shapers 106. The binary signals for Tracks 1–4 are supplied by pulse shapers 106 to a set of AND gates **110*a* and to a set of AND gates 110*b*. Either one or the other of AND gate sets 110*a* and 110*b* will be operative, depending upon whether Channel A or Channel B data values are being detected. If a Channel A data group is being detected, then the resulting binary "one" level pulses from Tracks 5 and 6 are passed by an AND circuit 111 to provide a transfer pulse for the AND gates 110*a***. The leading edge of this transfer pulse is detected by a differentiating circuit (*d/dt*) **112*a* and is used to reset storage register 42*a* to a zero count condition. The main body of the transfer pulse is then used by the AND gates 110*a* to produce pulses on the input lines of storage register 42*a* for those lines for which "one" values are being supplied by pulse shapers 106 to the AND gates 110*a*. This stores the new bit values in the storage register 42*a*. This stored data value is continuously monitored by a digital-to-analog converter 43*a* which develops a corresponding analog output signal. This analog signal is supplied by way of filter 44*a* to the output terminal for Channel A. If a Channel B code pattern (0–1) had been detected in Tracks 5 and 6, then no transfer pulse would have appeared at the output of AND circuit 111 and storage register 42*a*** would not have been reset, nor would it have had new data stored therein.

The Tracks 5 and 6 output lines from pulse shapers 106 are also coupled to inverter circuit 107 and AND circuit 108 for producing at the output of AND circuit 108 a transfer pulse whenever the Channel B "0–1" code pattern is detected. This Channel B transfer pulse is supplied to the set of AND gates **110*b* and to a differentiating circuit 112*b*. The leading edge of this pulse is passed by the differentiating circuit 112*b* and is used to reset a storage register 42*b* to a zero count condition. The undifferentiated transfer pulse supplied to AND gates 110*b* produces pulses on the appropriate input lines for the storage register 42*b*. This sets the Channel B data value into the register 42*b*. This data value is continuously converted to analog form by the digital-to-analog converter 43*b* and the resulting analog signal is supplied by way of a filter 44*b*** to the output terminal for Channel B.

In the foregoing manner, the magnetic tape 14 may be read and the corresponding data values separated and supplied to different utilization devices such as, for example, different recording elements of a strip chart type graphic recorder. The digital signals appearing at the outputs of storage registers **42*a* and 42*b*** may, of course, also be used directly by various types of digital data processing apparatus.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A method of recording on a third magnetic tape digital indications previously recorded on individual first and second tapes comprising: moving the first and second tapes past first and second magnetic reading head means, respectively, in a discontinuous stepwise manner; detecting digital indications recorded on the two tapes and using these detected indications to control the stepping of the two tapes so that they are stepped in synchronism with each other; moving a third tape past magnetic recording head means in a discontinuous stepwise manner by using the detected indications to control the stepping thereof; and recording digital indications obtained from the first two tapes on the third tape during the discontinuous movement thereof.

2. A method of recording on a third magnetic tape digital indications previously recorded on individual first and second tapes comprising: moving the first and second tapes past first and second magnetic reading head means, respectively, in a discontinuous stepwise manner; detecting digital indications recorded on the two tapes and using these detected indications to control the stepping of the two tapes so that they are advanced in step with each other; moving a third tape past magnetic recording head means in a discontinuous stepwise manner by using the detected indications to control the stepping thereof so that the third tape is advanced a step each time the first two tapes are advanced a step; and recording digital indications obtained from the first two tapes on the third tape during the discontinuous movement thereof.

3. A method of recording on a third magnetic tape digital indications previously recorded on individual first and second tapes comprising: advancing the first and second tapes past first and second magnetic reading head means, respectively; detecting digital indications recorded on the two tapes and stopping the movement of each tape upon the detection of a predetermined number of successive digital indications thereon; repeating the steps of advancing, detecting and stopping until the desired lengths of the first and second tapes have been examined; moving during this repeating a third tape past magnetic recording head means in a discontinuous stepwise manner by using the detected indications to control the stepping thereof; and recording digital indications obtained from the first two tapes on the third tape during the discontinuous movement thereof.

References Cited

UNITED STATES PATENTS

| | | | |
|---|---|---|---|
| 2,986,725 | 5/1961 | Dirks | 340—174.1 |
| 3,184,581 | 5/1965 | Willoughby | 340—174.1 |

TERRELL W. FEARS, Primary Examiner